United States Patent
Lee et al.

(10) Patent No.: US 9,277,232 B2
(45) Date of Patent: Mar. 1, 2016

(54) APPARATUS AND METHOD OF ENCODING AND DECODING IMAGE DATA USING COLOR CORRELATION

(75) Inventors: Sang Jo Lee, Suwon-si (KR); Shi Hwa Lee, Gangnam-gu (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 844 days.

(21) Appl. No.: 12/805,455

(22) Filed: Jul. 30, 2010

(65) Prior Publication Data

US 2011/0032987 A1   Feb. 10, 2011

(30) Foreign Application Priority Data

Aug. 10, 2009   (KR) .................. 10-2009-0073173

(51) Int. Cl.
| | |
|---|---|
| H04N 7/12 | (2006.01) |
| H04N 19/186 | (2014.01) |
| H04N 19/105 | (2014.01) |
| H04N 19/176 | (2014.01) |
| H04N 19/593 | (2014.01) |
| H04N 19/103 | (2014.01) |

(52) U.S. Cl.
CPC ........... *H04N 19/186* (2014.11); *H04N 19/103* (2014.11); *H04N 19/105* (2014.11); *H04N 19/176* (2014.11); *H04N 19/593* (2014.11)

(58) Field of Classification Search
USPC ....................... 375/240.01, 240.12
See application file for complete search history.

(56) References Cited

U.S. PATENT DOCUMENTS

| | | | | |
|---|---|---|---|---|
| 8,094,722 | B2 * | 1/2012 | Wang .................. | 375/240.13 |
| 8,111,914 | B2 * | 2/2012 | Lee et al. ............ | 382/166 |
| 2006/0215763 | A1 * | 9/2006 | Morimoto et al. ...... | 375/240.18 |
| 2006/0239349 | A1 * | 10/2006 | Shibayama ........... | 375/240.12 |
| 2007/0211797 | A1 * | 9/2007 | Kim et al. ............ | 375/240.12 |
| 2008/0002769 | A1 * | 1/2008 | Matsui ................ | 375/240.13 |
| 2008/0122862 | A1 | 5/2008 | Song | |
| 2009/0154557 | A1 * | 6/2009 | Zhao et al. ........... | 375/240.03 |
| 2010/0034265 | A1 * | 2/2010 | Kim et al. ............ | 375/240.13 |

FOREIGN PATENT DOCUMENTS

| | | |
|---|---|---|
| KR | 10-2007-0009336 | 1/2007 |
| KR | 10-2007-0096736 | 10/2007 |
| KR | 10-2007-0096737 | 10/2007 |
| KR | 10-2008-0004012 | 1/2008 |
| KR | 10-2008-0004013 | 1/2008 |
| KR | 10-2008-0015592 | 2/2008 |
| KR | 10-2008-0034131 | 4/2008 |
| WO | 2007/010901 A1 | 1/2007 |

OTHER PUBLICATIONS

Korean Office Action issued Nov. 2, 2015 in corresponding Korean Patent Application 10-2009-0073173.

* cited by examiner

*Primary Examiner* — Tracy Li

(74) *Attorney, Agent, or Firm* — Staas & Halsey LLP

(57) ABSTRACT

An image data encoding apparatus and method and an image data decoding apparatus and method are provided. The image data encoding apparatus may perform at least one image prediction with respect to image data, and select a prediction mode for encoding. The image data encoding apparatus may simultaneously perform both intra prediction and color prediction, and thereby may efficiently perform encoding.

12 Claims, 8 Drawing Sheets

FIG. 4
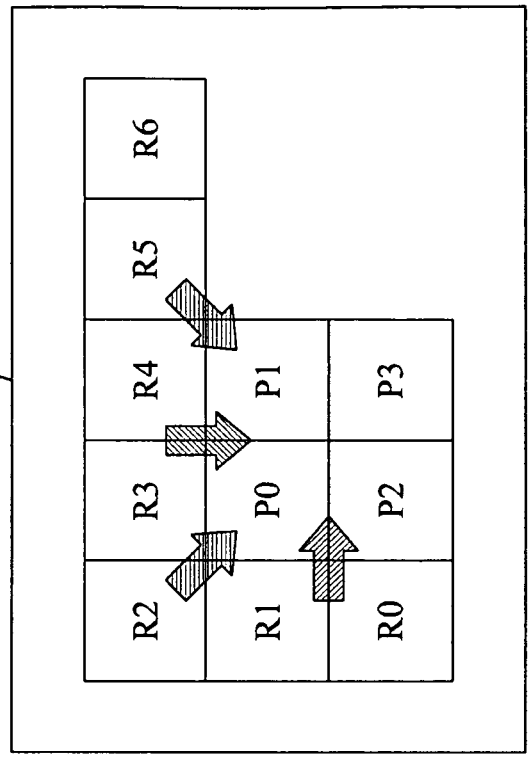
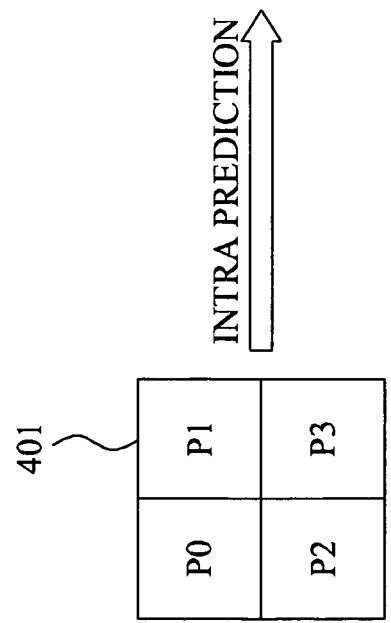

APPARATUS AND METHOD OF ENCODING AND DECODING IMAGE DATA USING COLOR CORRELATION

CROSS-REFERENCE TO RELATED APPLICATIONS

This application claims the benefit of Korean Patent Application No. 10-2009-0073173, filed on Aug. 10, 2009, in the Korean Intellectual Property Office, the disclosure of which is incorporated herein by reference.

BACKGROUND

1. Field

Example embodiments of the present disclosure relate to an image data encoding and decoding method, and more particularly, to a method of encoding and decoding an image using a correlation of colors in the image.

2. Description of the Related Art

An image data prediction method may be used as a method for compressing image data. Specifically, an estimation value that may efficiently restore image data by predicting the image data may be obtained, and thus highly efficient compression may be performed using a small amount of data.

In the conventional art, since a prediction method may be applied regardless of an image data type, coding efficiency may be reduced. Also, since a prediction method is uniformly applied even when a particular prediction method is not required, an image quality may be degraded. Accordingly, a method for highly efficient compression based on a characteristic of image data is desired.

SUMMARY

According to example embodiments of the present disclosure, an image data encoding apparatus may be provided. The image data encoding apparatus may include an image prediction unit to perform at least one image prediction with respect to image data, and to select a prediction mode based on a result of the image prediction; and an encoding unit to encode residual data and the prediction mode and to generate a bitstream, the residual data being the result of the image prediction.

The image prediction unit may include a first prediction unit to perform intra prediction based on a spatial correlation of the image data which is divided by a coding unit; a second prediction unit to perform color prediction based on a color correlation of the image data where the intra prediction is performed; and a mode selection unit to compare an error value of the intra prediction and an error value of the intra prediction and the color prediction, and to select a prediction mode for each coding unit.

According to example embodiments of the present disclosure an image data decoding apparatus may be provided. The image data decoding apparatus may include a pre-decoding unit to extract residual data of encoded image data by performing pre-decoding with respect to the image data, and to select a prediction mode; and a prediction decoding unit to perform prediction decoding based on the selected prediction mode and to determine original data of the image data from the residual data.

The prediction decoding unit may include a first prediction decoding unit to perform color prediction decoding based on a color correlation of the image data using the residual data; and a second prediction decoding unit to perform intra prediction decoding based on a spatial correlation of the image data using the residual data or a decoding result of the first prediction decoding unit.

According to example embodiments of the present disclosure an image data encoding method may be provided. The image data encoding method may include performing at least one image prediction with respect to image data, and selecting a prediction mode based on a result of the image prediction; and encoding residual data and the prediction mode and generating a bitstream, the residual data being the result of the image prediction.

The selecting may include performing intra prediction based on a spatial correlation of the image data which is divided by a coding unit; performing color prediction based on a color correlation of the image data where the intra prediction is performed; and comparing an error value of the intra prediction and an error value of the intra prediction and the color prediction, and selecting a prediction mode for each coding unit.

According to example embodiments of the present disclosure an image data decoding method may be provided. The image data decoding method may include extracting residual data of encoded image data by performing pre-decoding with respect to the image data, and selecting a prediction mode; and performing prediction decoding based on the selected prediction mode and determining original data of the image data from the residual data.

The determining may include performing color prediction decoding based on a color correlation of the image data using the residual data; and performing intra prediction decoding based on a spatial correlation of the image data using the residual data or a result of the color prediction decoding.

According to example embodiments of the present disclosure, an intra prediction and a color prediction may be adaptively applied based on a correlation of Red, Green, Blue (RGB) image data, and thus a high efficient compression may be performed and a high image quality may be maintained.

Also, according to example embodiments of the present disclosure, a result of an intra prediction and a result of performing both color prediction and intra prediction may be compared, a prediction mode having a smaller error may be selected for each coding unit, and thus image data may be coded differently for each coding unit of the image data, and a coding efficiency may be improved.

Also, according to example embodiments of the present disclosure, both intra prediction and color prediction may be applied without limit of a particular prediction mode, an optimum prediction mode may be selected based on a prediction result, and thus an efficient coding may be performed.

Additional aspects of the example embodiments will be set forth in part in the description which follows and, in part, will be apparent from the description, or may be learned by practice of the embodiments.

BRIEF DESCRIPTION OF THE DRAWINGS

These and/or other aspects will become apparent and more readily appreciated from the following description of the example embodiments, taken in conjunction with the accompanying drawings of which:

FIG. 4 illustrates an example of intra prediction according to example embodiments;

DETAILED DESCRIPTION

Figure 1:
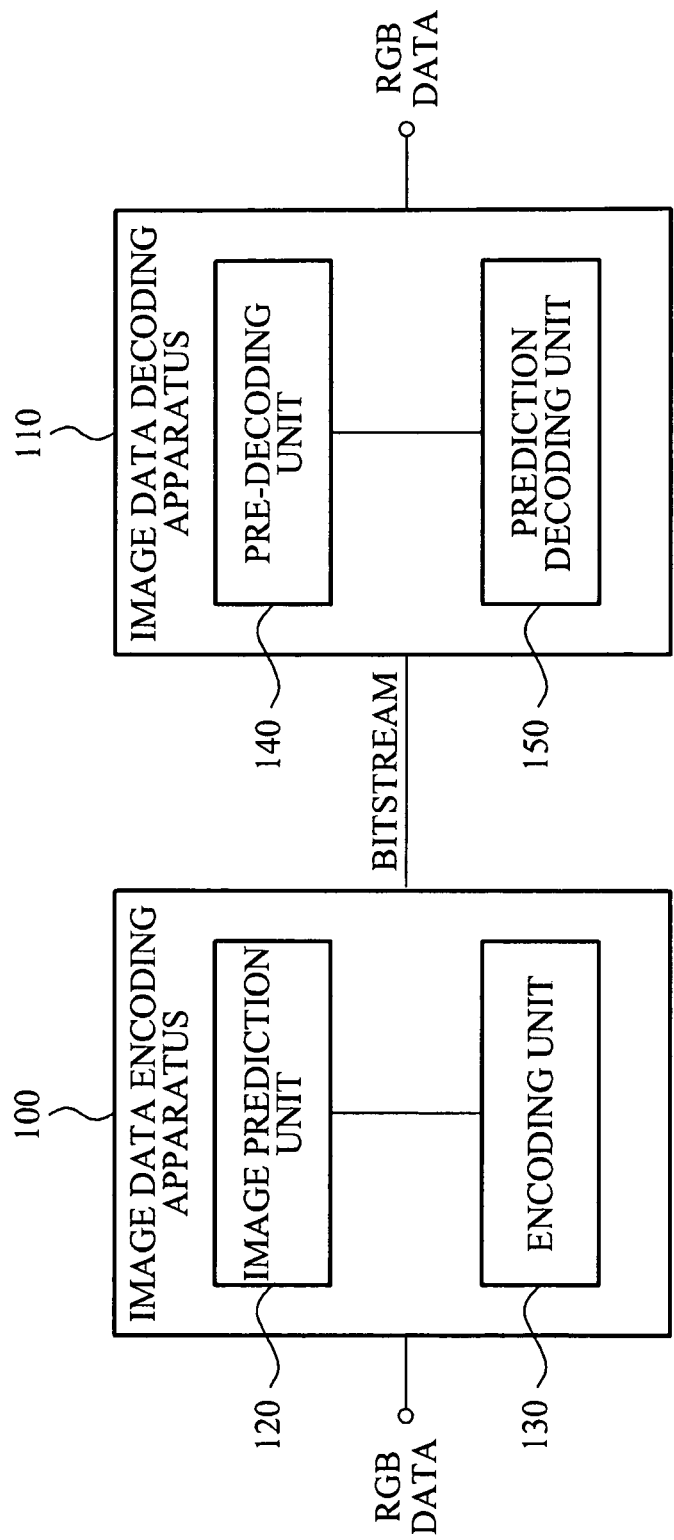
FIG. 1 illustrates a block diagram of a configuration of an image data encoding apparatus and an image data decoding apparatus according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

FIG. 1 illustrates a block diagram of a configuration of an image data encoding apparatus 100 and an image data decoding apparatus 110 according to example embodiments.

Referring to FIG. 1, the image data encoding apparatus 100 may include an image prediction unit 120 and an encoding unit 130. Also, the image data decoding apparatus 110 may include a pre-decoding unit 140 and a prediction decoding unit 150.

The image prediction unit 120 may perform at least one image prediction with respect to image data, and select a prediction mode based on a result of the image prediction. Specifically, the image prediction unit 120 may perform prediction with respect to Red, Green, Blue (RGB) image data.

For example, the image prediction unit 120 may perform intra prediction based on a spatial correlation of image data. Also, the image prediction unit 120 may perform color prediction based on a color correlation of the image data. Subsequently, the image prediction unit 120 may select a prediction mode having a smaller error from a result of the intra prediction and a result of simultaneously performing the intra prediction and the color prediction. Also, residual data may be generated through the prediction of the image data.

The encoding unit 130 may encode the residual data and the prediction mode, and generate a bitstream.

The pre-decoding unit 140 may extract the encoded residual data by decoding the bitstream, and select a prediction mode. The prediction decoding unit 150 may perform intra prediction decoding and color prediction decoding, or perform only intra prediction decoding based on the selected prediction mode for each coding unit of the image data.

That is, both the intra prediction and the color prediction may be performed based on the color correlation of the image data, a most efficient prediction mode may be selected, and thus an efficiency of an image codec may be improved.

Figure 2:
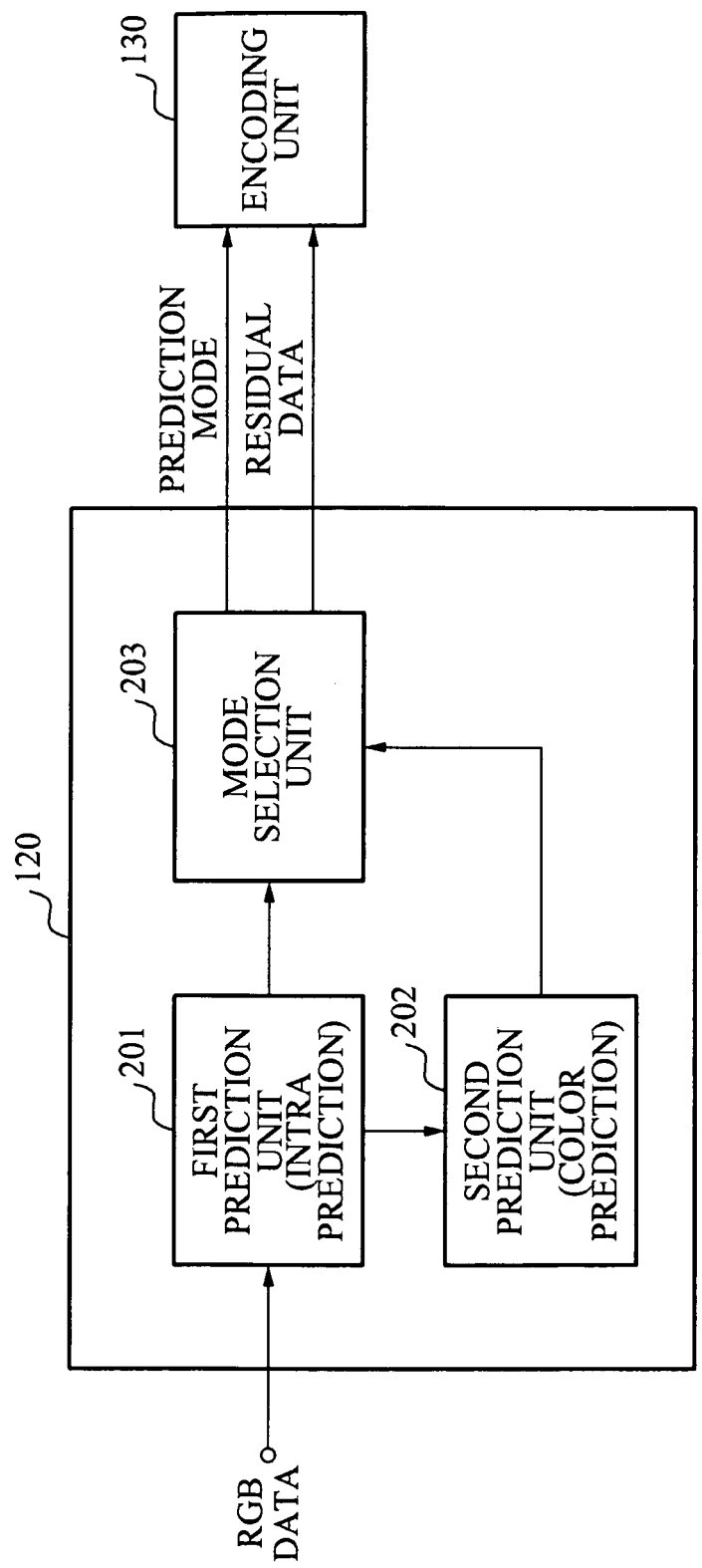
FIG. 2 illustrates an image data encoding apparatus according to example embodiments.

FIG. 2 illustrates an image data encoding apparatus according to example embodiments.

Referring to FIG. 2, an image prediction unit 120 may include a first prediction unit 201, a second prediction unit 202, and a mode selection unit 203.

The first prediction unit 201 may perform intra prediction based on a spatial correlation of image data that is divided by a coding unit. For example, the first prediction unit 201 may perform the intra prediction using a difference between adjacent coding units in the image data. In this instance, the coding unit may be any one of a pixel and a block of the image data.

The first prediction unit 201 may perform the intra prediction based on the coding unit in a vertical, horizontal, right-down, or left-down direction.

The second prediction unit 202 may perform color prediction based on a color correlation of the image data where the intra prediction is performed. In this instance, the image data may be RGB image data. For example, the second prediction unit 202 may perform the color prediction with respect to Red (R) and Blue (B) by referring to a prediction result of Green (G). Here, the prediction result of G may be obtained through the intra prediction.

The mode selection unit 203 may determine an error estimation value of the intra prediction and an error estimation value of both the color prediction and the intra prediction. Also, the mode selection unit 203 may select a prediction mode having a relatively smaller error estimation value for each coding unit. The error estimation values may be determined by a difference between an original value and an estimation value of the image data. For example, the error estimation value may be determined using any one of a Sum of Absolute Difference (SAD) and a Maximum Difference (MAXDiff).

In this instance, the error estimation value may correspond to residual data. The encoding unit 130 may encode the residual data and the prediction mode selected for each coding unit, and thereby may generate a bitstream. For example, the encoding unit 130 may perform encoding based on an encoding scheme such as a Transform/Quantization, Entropy encoding, and the like.

Figure 3:
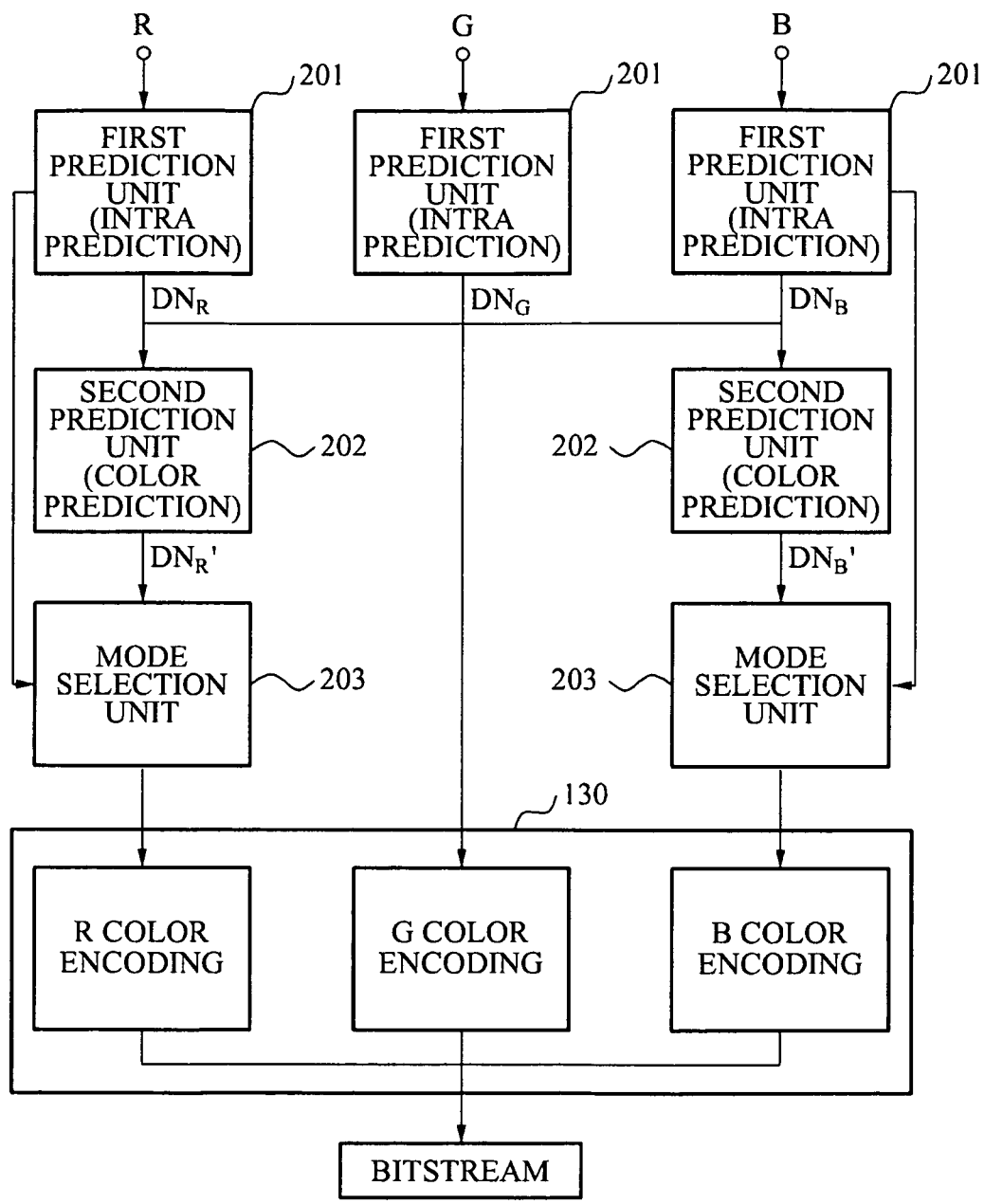
FIG. 3 illustrates an example of encoding after image prediction according to example embodiments.

FIG. 3 illustrates an example of encoding after image prediction according to example embodiments.

A first prediction unit 201 may perform intra prediction with respect to each of R, G, and B colors of image data. In FIG. 3, a difference between an original value and an estimation value, obtained through the intra prediction, may be $DN_R$, $DN_G$, and $DN_B$. In this instance, YUV image data may be inputted. According to example embodiments, however, RGB image data may be inputted to compress a high definition image and to prevent image quality from being degraded.

A second prediction unit 202 may extract $DN'_R$ and $DN'_B$ by performing color prediction with respect to $DN_R$ and $DN_B$ obtained by the first prediction unit 201. In this instance, the second prediction unit 202 may obtain $DN'_R$ and $DN'_B$ through the color prediction by referring to $DN_G$ obtained by the first prediction unit 201.

For example, $DN_R$, $DN_G$, and $DN_B$, which are results of the intra prediction with respect to each of the R, G, and B data, may be determined by, $$DN_R = RN - RN_{ref}$$

$$DN_G = GN - GN_{ref}$$

$$DN_B = BN - BN_{ref} \quad \text{[Equation 1]}$$

where D may denote a difference, and N may denote a number of a coding unit. $RN_{ref}$, $GN_{ref}$, and $BN_{ref}$ may denote a reference value of each of the R, G, and B.

Also, $DN'_R$ and $DN'_R$, which are results of the color prediction, may be determined through the second prediction unit 202 according to Equation 2.

$$DN_G = DN_G$$

$$DN_R' = DN_R - DN_G \times \text{WeightingParam(WeightingParam=0~1)}$$

$$DN_B' = DN_B - DN_G \times \text{WeightingParam(WeightingParam=0~1)} \quad \text{[Equation 2]}$$

A mode selection unit 203 may compare an error estimation value of the intra prediction (DPCMINTRA: $DN_G$, $DN_R$, and $DN_B$) and an error estimation value of both the intra prediction and the color prediction (DPCMCOLOR: $DN_G$, $DN'_R$, and $DN'_B$). Accordingly, the mode selection unit 203 may select a prediction mode having a smaller error estimation value.

In this instance, the mode selection unit 203 may determine the error estimation value using any one of a SAD and a MAXDiff. For example, the mode selection unit 203 may determine the error estimation value according to Equation 3.

$$SAD = \sum_{k=0}^{N-1} |Diff_k|$$

$$MAXDiff = Max(Diff_0, Diff_1, \ldots, Diff_{N-1})$$

[Equation 3]

Subsequently, an encoding unit 130 may perform encoding with respect to each of the R, G, and B data. In this instance, the encoding unit 130 may perform encoding with respect to R and B using $DN'_R$ and $DN'_B$, and perform encoding with respect to G using $DN_G$. Here, $DN'_R$, $DN'_B$, and $DN_G$ may be residual data. Also, the encoding unit 130 may encode a prediction mode selected for each coding unit. After encoding the image data, the encoding unit 130 may generate a bitstream.

For example, although it is not illustrated in FIG. 3, the encoding unit 130 may include a transform unit, a quantization unit, and a bitstream coding unit. The transform unit may apply a transform scheme such as a Discrete Cosine Transform (DCT) to improve a compression efficiency of the image data. The quantization unit may adjust a compression ratio and perform a high ratio compression.

Also, the bitstream coding unit may code residual data and a prediction mode including an intra prediction mode and a color prediction mode, and generate a bitstream from the encoded data. In this instance, the bitstream coding unit may apply Variable Length Coding (VLC) or Fixed Length Coding (FLC). Also, the residual data may be Differential Pulse-Code Modulation (DPCM) data or Q-DPCM data where quantization is applied, or transformed DPCM data or Q-transformed DPCM data.

FIG. 4 illustrates an example of an intra prediction according to example embodiments.

A first prediction unit 201 may perform intra prediction based on a spatial correlation of image data that is divided by a coding unit 401. In this instance, the coding unit 401 may be a pixel or a block of the image data. The coding unit 401 of FIG. 4 may indicate a 2*2 block. As a size of the pixel or block of the coding unit 401 increases, a mode assignment bit ratio may be relatively reduced. Accordingly, coding efficiency may be improved.

The first prediction unit 201 may perform the intra prediction using a difference between adjacent coding units in the image data. For example, the first prediction unit 201 may perform the intra prediction based on the coding unit 401 in a vertical, horizontal, right-down, or left-down direction.

For example, an intra prediction in a vertical direction may be performed according to Equation 4.

$D0=P0-R3$ $D1=P1-R4$ $D2=P2-P0$ $D3=P3-P1$ [Equation 4]

That is, an intra prediction D0 in a vertical direction with respect to P0 may be determined by a difference between P0 and R3. An intra prediction D1 in a vertical direction with respect to P1 may be determined by a difference between P1 and R4. Also, an intra prediction D2 in a vertical direction with respect to P2 may be determined by a difference between P2 and P0, and an intra prediction D3 in a vertical direction with respect to P3 may be determined by a difference between P3 and P1.

For example, an intra prediction in a horizontal direction may be performed according to Equation 5.

$D0=P0-R1$ $D1=P1-P0$ $D2=P2-R0$ $D3=P3-P2$ [Equation 5]

That is, an intra prediction D0 in a horizontal direction with respect to P0 may be determined by a difference between P0 and R1. An intra prediction D1 in a horizontal direction with respect to P1 may be determined by a difference between P1 and P0. Also, an intra prediction D2 in a horizontal direction with respect to P2 may be determined by a difference between P2 and R0, and an intra prediction D3 in a horizontal direction with respect to P3 may be determined by a difference between P3 and P2.

For example, an intra prediction in a right-down direction may be performed according to Equation 6.

$D0=P0-(R1+R3+1)/2$ $D1=P1-(P0+R4+1)/2$ $D2=P2-(R0+P0+1)/2$ $D3=P3-(P2+P1+1)/2$ [Equation 6]

That is, an intra prediction D0 in a right-down direction with respect to P0 may be determined by a difference among P0 and blocks adjacent to P0. Here, the blocks adjacent to P0 may include R1 and R3. Also, an intra prediction D1 in a right-down direction with respect to P1 may be determined by a difference among P1 and blocks adjacent to P1. Here, the blocks adjacent to P1 may include P0 and R4. Also, an intra prediction D2 in a right-down direction with respect to P2 may be determined by a difference among P2 and blocks adjacent to P2. Here, the blocks adjacent to P2 may include R0 and P0. Also, an intra prediction D3 in a right-down direction with respect to P3 may be determined by a difference among P3 and blocks adjacent to P3. Here, the blocks adjacent to P3 may include P1 and P2.

For example, an intra prediction in a left-down direction may be performed according to Equation 7.

$D0=P0-R4$ $D1=P1-R5$ $D2=P2-P1$ $D3=P3-R6$ [Equation 7]

That is, an intra prediction D0 in a left-down direction with respect to P0 may be determined by a difference between P0 and R4. An intra prediction D1 in a left-down direction with respect to P1 may be determined by a difference between P1 and R5. Also, an intra prediction D2 in a left-down direction with respect to P2 may be determined by a difference between P2 and P1, and an intra prediction D3 in a left-down direction with respect to P3 may be determined by a difference between P3 and R6.

Accordingly, a difference between an original value and an estimation value, that is, $DN_R$, $DN_G$, and $DN_B$ may be obtained through the intra prediction. The prediction operations according to Equation 4, Equation 5, Equation 6, and Equation 7 are simply provided as examples, and a predication operation may vary depending on a configuration of a system.

Thus, a prediction mode may be finally determined as Intra Vertical, Intra Vertical+Color Prediction, Intra Horizontal, Intra Horizontal+Color Prediction, Intra Right-down, Intra Right-down+Color Prediction, Infra Left-down, and Intra Left-down+Color Prediction.

Figure 5:
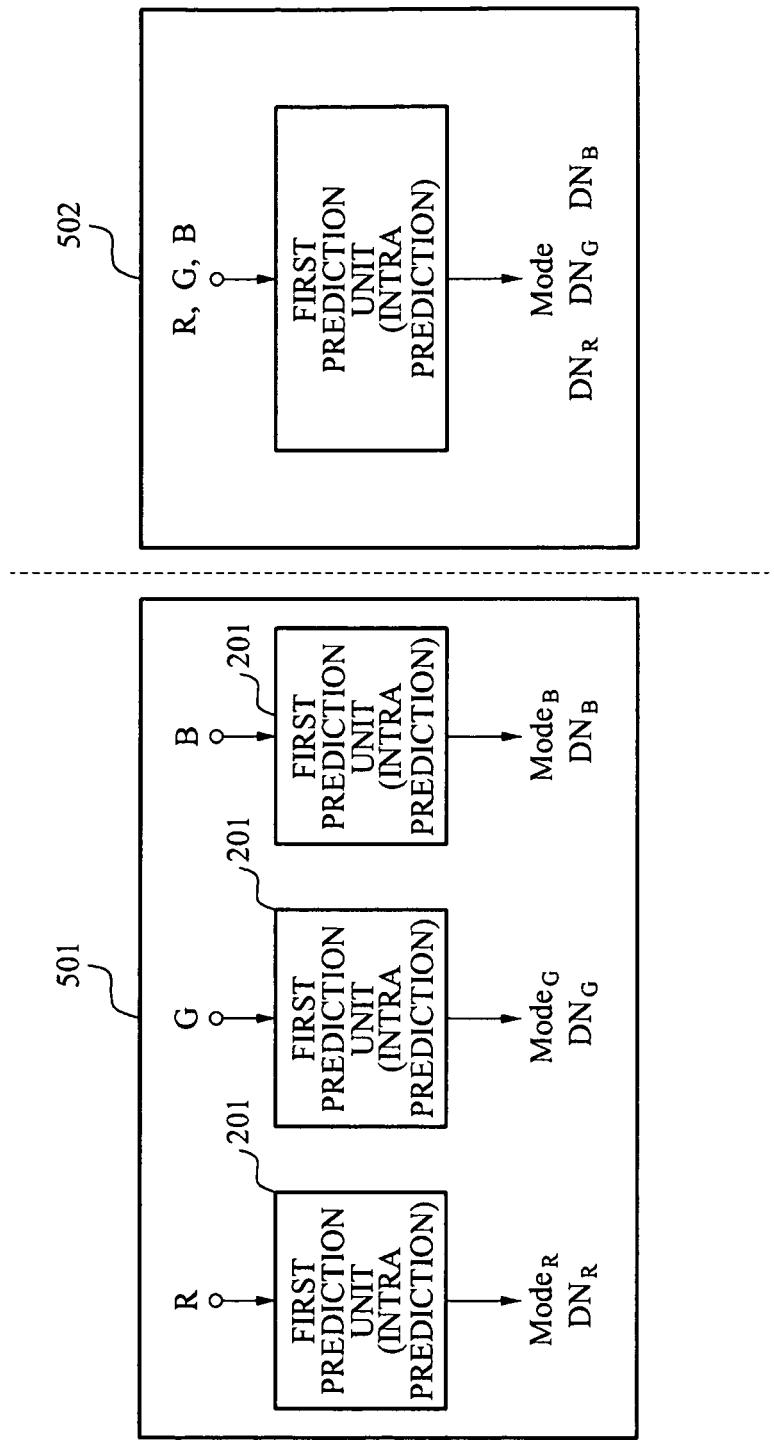
FIG. 5 illustrates an example of an operation for performing intra prediction with respect to Red, Green, Blue (RGB) image data and extracting residual data according to example embodiments.

FIG. 5 illustrates an example of an operation of performing an intra prediction with respect to RGB image data and extracting residual data according to example embodiments.

Through a first intra prediction 501, a result when a first prediction unit 201 performs intra prediction for each of R, G, and B colors of image data may be obtained. Accordingly, a prediction mode and residual data for each of the colors may be extracted.

Through a second intra prediction 502, the first prediction unit 201 may perform a single intra prediction by combining each of the R, G, and B colors of the image data. In this instance, a prediction mode of a color that may have a minimum error estimation value by combining the R, G, and B colors may be selected.

Figure 6:
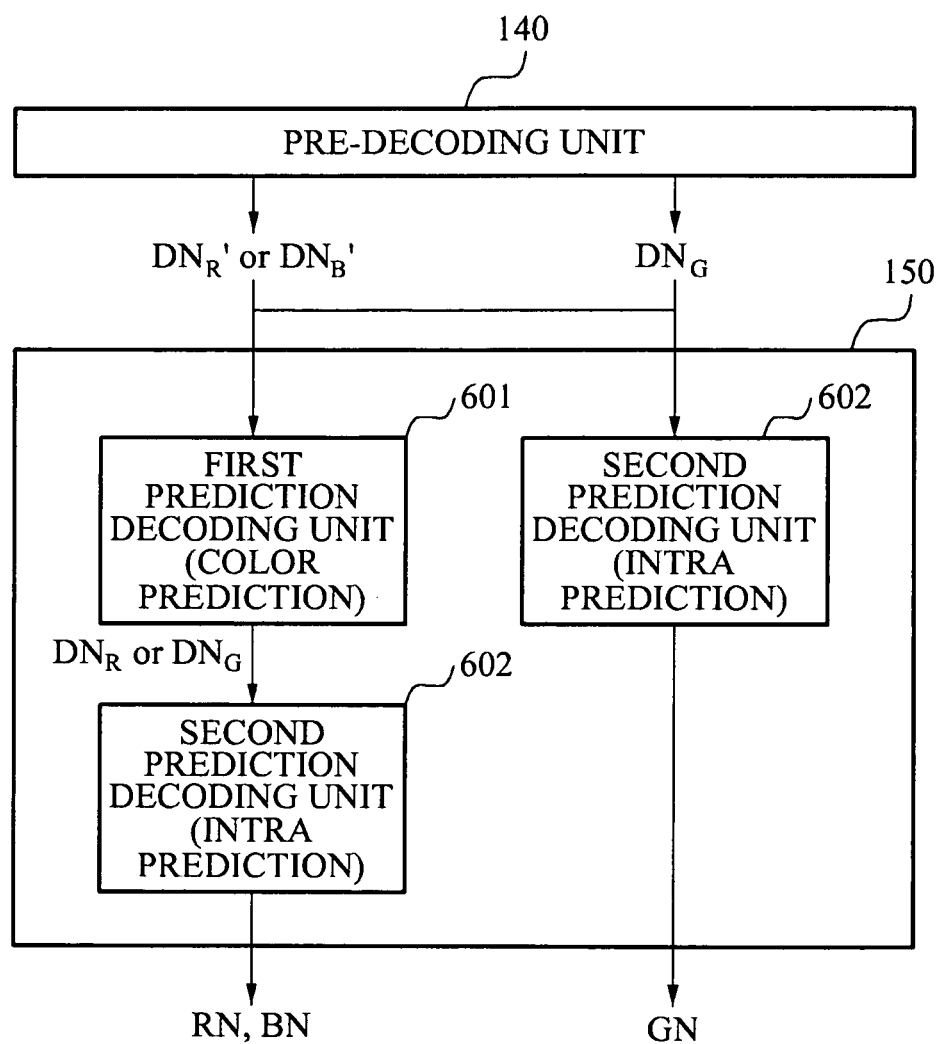
FIG. 6 illustrates an example of an image data decoding apparatus according to example embodiments.

FIG. 6 illustrates an example of an image data decoding apparatus according to example embodiments.

Referring to FIG. 6, a prediction decoding unit 150 may include a first prediction decoding unit 601 and a second prediction decoding unit 602. In this instance, the prediction decoding unit 150 may perform prediction decoding based on a prediction mode for each coding unit. Here, the prediction mode may be selected by a pre-decoding unit 140. The pre-decoding unit 140 may extract residual data by decoding a bitstream encoded by the image data encoding apparatus 100, and select a prediction mode for each coding unit.

Although not illustrated in FIG. 6, the pre-decoding unit 140 may include a bitstream decoding unit, a dequantization unit, and an inverse transform unit. The bitstream decoding unit may decode a bitstream generated through an encoding unit 130. Specifically, the bitstream decoding unit may decode a prediction mode and residual data in the bitstream. For example, the bitstream decoding unit may apply a Variable Length Decoding (VLD) or a Fixed Length Decoding (FLD). The residual data may be DPCM data or Q-DPCM data where quantization is applied, or transformed DPCM data or Q-transformed DPCM data. The dequantization unit may restore data. The inverse transform unit may perform an inverse transform such as an inverse DCT.

The prediction decoding unit 150 may perform prediction decoding based on the prediction mode which is selected through the pre-decoding.

The first prediction decoding unit 601 may perform color prediction decoding based on a color correlation of the image data using the residual data. For example, the first prediction decoding unit 601 may perform the color prediction decoding with respect to residual data of Red (R) and Blue (B), that is, $DN'_R$ and $DN'_B$, by referring to residual data of G, that is, $DN_G$. As a result of the color prediction decoding, residual data of R and B, that is, $DN_R$ and $DN_B$, may be obtained.

For example, the first prediction decoding unit 601 may perform color prediction decoding according to Equation 8.

$DN_R = DN'_R + DN_G \times \text{WeightingParam}$ $DN_B = DN'_B + DN_G \times \text{WeightingParam}$ [Equation 8]

The second prediction decoding unit 602 may perform intra prediction decoding based on a spatial correlation of the image data, using the residual data or the decoding result of the first prediction decoding unit 601. For example, the second prediction decoding unit 602 may perform intra prediction decoding with respect to the result of the color prediction decoding, that is, $DN_R$ and $DN_B$, and thereby may generate original data of R and B, that is, RN and BN. Also, the second prediction decoding unit 602 may perform intra prediction decoding with respect to $DN_G$, that is, the residual data of G, and thereby may generate original data of G, that is, GN.

For example, the second prediction decoding unit 602 may perform intra prediction decoding according to Equation 9.

$RN = DN_R + RN_{ref}$ $GN = DN_G + GN_{ref}$ $BN = DN_B + BN_{ref}$ [Equation 9]

Figure 7:
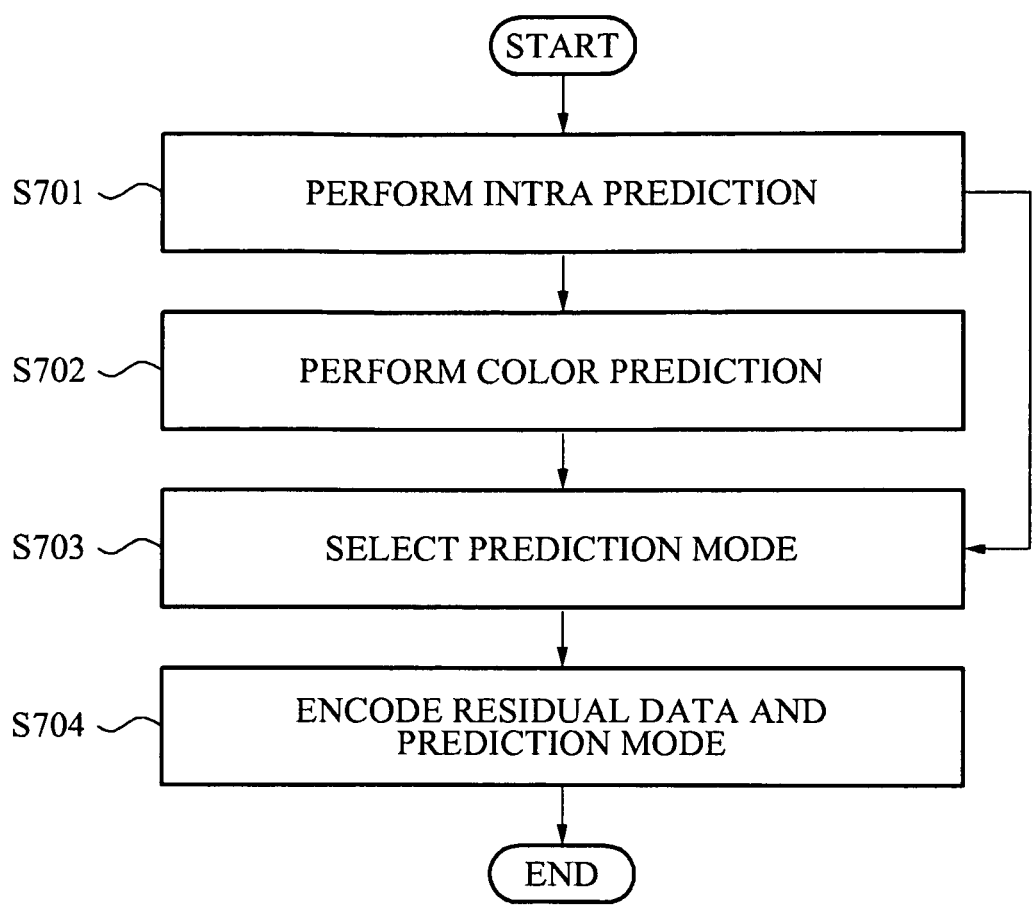
FIG. 7 illustrates a flowchart of an image data encoding method according to example embodiments.

FIG. 7 illustrates a flowchart of an image data encoding method according to example embodiments.

In operation S701, an image data encoding apparatus 100 may perform intra prediction based on a spatial correlation of image data that is divided by a coding unit. For example, the image data encoding apparatus 100 may perform the intra prediction using a difference between adjacent coding units in the image data. The coding unit may be any one of a pixel and a block. In this instance, the image data encoding apparatus 100 may perform the intra prediction based on the coding unit in a vertical, horizontal, right-down, or left-down direction.

In operation S702, the image data encoding apparatus 100 may perform color prediction based on a color correlation of the image data where the intra prediction is performed. For example, the image data encoding apparatus 100 may perform the color prediction with respect to R and B by referring to a prediction result of G. Here, the prediction result of G may be obtained through the intra prediction.

In operation S703, the image data encoding apparatus 100 may compare an error value of the intra prediction and an error value of both the intra prediction and the color prediction, and select a prediction mode for each coding unit. That is, the image data encoding apparatus 100 may select the prediction mode for each coding unit based on a result of the intra prediction and a result of simultaneously performing the intra prediction and the color prediction.

In this instance, the image data encoding apparatus 100 may compare an error estimation value of the intra prediction and an error estimation value of both the intra prediction and the color prediction, and select a prediction mode having a smaller error estimation value. Here, the image data encoding apparatus 100 may determine the error estimation value using any one of a SAD and a MAXDiff.

In operation S704, the image data encoding apparatus 100 may encode the prediction mode and residual data when the prediction mode is determined for each coding unit. Accordingly, a bitstream where the prediction mode and the residual data are encoded may be generated.

Figure 8:
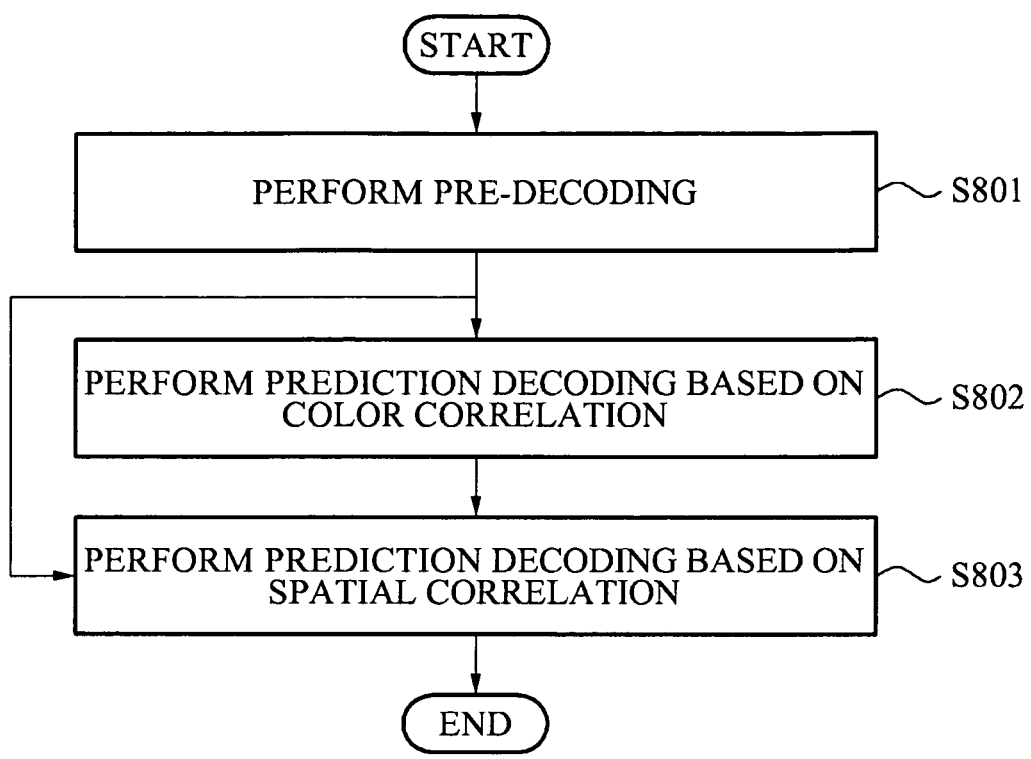
FIG. 8 illustrates a flowchart of an image data decoding method according to example embodiments.

FIG. 8 illustrates a flowchart of an image data decoding method according to example embodiments.

In operation S801, an image data decoding apparatus 110 may perform pre-decoding with respect to a bitstream of image data. In this instance, the image data decoding apparatus 110 may extract encoded residual data through the pre-decoding, and select a prediction mode for each coding unit.

In operation S802, the image data decoding apparatus 110 may perform color prediction decoding based on a color correlation of the image data using the residual data extracted through the pre-decoding. For example, the image data decoding apparatus 110 may perform color prediction decoding with respect to residual data of R and B by referring to residual data of G.

In operation S803, the image data decoding apparatus 110 may perform intra prediction decoding based on a spatial correlation of the image data using the residual data or a decoding result of the color prediction decoding. For example, the image data decoding apparatus 110 may perform intra prediction decoding with respect to the result of the color prediction decoding, and generate original data of R and B. Also, the image data decoding apparatus 110 may perform intra prediction decoding with respect to the residual data of G, and generate original data of G.

That is, the image data decoding apparatus 110 may perform only intra prediction decoding or simultaneously perform intra prediction decoding and color prediction decoding.

Descriptions of FIGS. 1 through 6 may be referred to for portions which have not been described with reference to FIGS. 7 and 8.

The image data encoding/decoding method according to the above-described example embodiments may be recorded in a computer-readable media including program instructions to implement various operations embodied by a computer. The media may also include, alone or in combination with the program instructions, data files, data structures, and the like. Examples of computer-readable media include: magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. The instructions may be executed on any processor, general purpose computer, or special purpose computer including an image data encoding/decoding system or apparatus and the software modules may be controlled by any processor.

Although a few example embodiments have been shown and described, it would be appreciated by those skilled in the art that changes may be made in these example embodiments without departing from the principles and spirit of the disclosure, the scope of which is defined in the claims and their equivalents.

What is claimed is:

1. An image data encoding apparatus, comprising:
    an image prediction unit comprising;
        a first prediction unit to perform intra prediction based on a spatial correlation of image data that is divided by a coding unit;
        a second prediction unit to perform color prediction based on a color correlation of the image data where the intra prediction is performed; and
        a mode selection unit to select a prediction mode for at least one coding unit based on a result of the performing of the intra prediction by the first prediction unit and the color prediction by the second prediction unit; and
    an encoding unit, controlled by a processor, to encode residual data and the selected prediction mode, the residual data being the result of the image prediction,
    wherein the first prediction unit performs the intra prediction based on the coding unit in any one or more of a vertical, horizontal, right-down, and left-down direction, wherein the image data includes Red, Green, Blue (RGB) image data, and
    wherein the second prediction unit performs the color prediction with respect to Red (R) and Blue (B) by referring to a prediction result of Green (G), the prediction result of G being obtained through the intra prediction.

2. The image data encoding apparatus of claim 1, wherein the first prediction unit performs the intra prediction based on the coding unit in any one or more of a vertical, horizontal, right-down, and left-down direction.

3. The image data encoding apparatus of claim 1, wherein the mode selection unit compares an error estimation value of the intra prediction with an error estimation value obtained when both the intra prediction and the color prediction are performed simultaneously, and selects a prediction mode having a smaller error estimation value based on the comparison.

4. The image data encoding apparatus of claim 3, wherein the mode selection unit determines the error estimation value using any one of a Sum of Absolute Difference (SAD) and a Maximum Difference (MAXDiff).

5. An image data decoding apparatus, comprising:
    a pre-decoding unit to extract residual data of encoded image data by performing pre-decoding with respect to the image data, and to select a prediction mode; and
    a prediction decoding unit, controlled by a processor, to perform prediction decoding, the prediction decoding unit comprising:
        a first prediction decoding unit to perform color prediction decoding based on a color correlation of the image data using the residual data; and
        a second prediction decoding unit to perform intra prediction decoding based on a spatial correlation of the image data;
    wherein the prediction decoding unit selectively performs both the color prediction decoding and intra prediction decoding or performs the intra prediction decoding without performing the color prediction decoding based on the prediction mode selected by the pre-decoding unit,
    wherein the prediction decoding unit determines original data of the image data from the decoded data, and
    wherein the first prediction decoding unit performs the color prediction decoding with respect to residual data of R and B by referring to residual data of G, and
    wherein the second prediction decoding unit performs the intra prediction decoding with respect to a result of the color prediction decoding, and generates original data of the R and the B.

6. The image data decoding apparatus of claim 5, wherein the second prediction decoding unit performs the intra prediction decoding with respect to residual data of G, and generates original data of the G.

7. An image data encoding method, comprising:
performing, by way of a processor, intra prediction based on a spatial correlation of image data that is divided by a coding unit;
performing color prediction based on a color correlation of the image data where the intra prediction is performed;
selecting a prediction mode for at least one coding unit based on a result of the performing of intra prediction and the color prediction; and
encoding, by way of the processor, residual data and the selected prediction mode, the residual data being the result of the image prediction,
wherein the image data includes RGB image data, and
wherein the performing of the color prediction comprises performing the color prediction with respect to R and B by referring to a prediction result of G, the prediction result of G being obtained through the intra prediction.

8. The image data encoding method of claim 7, wherein the performing of the intra prediction performs the intra prediction using a difference between adjacent coding units in the image data, and the coding unit is any one of a pixel and a block.

9. The image data encoding method of claim 7, wherein the selecting of the prediction mode compares an error estimation value of the intra prediction with an error estimation value obtained when both of the intra prediction and the color prediction are performed simultaneously, and selects a prediction mode having a smaller error estimation value based on the comparison.

10. An image data decoding method, comprising:
extracting residual data of encoded image data by performing pre-decoding with respect to the image data, and selecting a prediction mode;
performing, by way of a processor, prediction decoding comprising selectively performing both color prediction decoding based on a color correlation of the image data using the residual data and intra prediction decoding based on a spatial correlation of the image data or performing the intra prediction decoding without performing the color prediction decoding based on the selected prediction mode; and
determining original data of the image data from the decoded data, wherein the performing of the color prediction decoding performs the color prediction decoding with respect to residual data of R and B by referring to residual data of G, and
wherein the performing of the intra prediction decoding performs the intra prediction decoding with respect to a result of the color prediction decoding, and generates original data of the R and the B.

11. The image data decoding method of claim 10, wherein the performing of the intra prediction decoding performs the intra prediction decoding with respect to residual data of G, and generates original data of the G.

12. A non-transitory computer-readable recording medium encoded with instructions causing at least one processing device to perform an image data encoding method comprising:
performing intra prediction based on a spatial correlation of image data that is divided by a coding unit;
performing color prediction based on a color correlation of the image data where the intra prediction is performed;
selecting a prediction mode for at least one coding unit based on a result of the performing of intra prediction and the color prediction; and
encoding residual data and the prediction mode, the residual data being the result of the image prediction,
wherein the performing of the intra prediction comprises performing the intra prediction based on the coding unit in any one or more of a vertical, horizontal, right-down, and left-down direction,
wherein the image data includes Red, Green, Blue (RGB) image data, and
wherein the performing of the color prediction comprises performing the color prediction with respect to Red (R) and Blue (B) by referring to a prediction result of Green (G), the prediction result of G being obtained through the intra prediction.

* * * * *